(12) United States Patent
Sutkowski et al.

(10) Patent No.: US 12,392,525 B2
(45) Date of Patent: Aug. 19, 2025

(54) ELECTRONIC TEMPERATURE LIMITING CONTROL

(71) Applicant: Rheem Manufacturing Company, Atlanta, GA (US)

(72) Inventors: Michael Sutkowski, Indianapolis, IN (US); Cameron Wright, Indianapolis, IN (US); Dean A. Drake, Oklahoma City, OK (US)

(73) Assignee: Rheem Manufacturing Company, Atlanta, GA (US)

( * ) Notice: Subject to any disclaimer, the term of this patent is extended or adjusted under 35 U.S.C. 154(b) by 1079 days.

(21) Appl. No.: 17/066,759

(22) Filed: Oct. 9, 2020

(65) Prior Publication Data

US 2022/0113061 A1   Apr. 14, 2022

(51) Int. Cl.
*H05B 1/02* (2006.01)
*F24D 17/00* (2022.01)
*F24H 9/20* (2022.01)
*G05B 19/042* (2006.01)

(52) U.S. Cl.
CPC ....... *F24H 9/2021* (2013.01); *F24D 17/0031* (2013.01); *G05B 19/042* (2013.01); *H05B 1/0244* (2013.01); *F24D 2220/042* (2013.01); *G05B 2219/2658* (2013.01)

(58) Field of Classification Search
CPC ...... F24H 9/2021; F24H 9/20; F24D 17/0031; F24D 2220/042; G05B 19/042; G05B 2219/2658; G05B 2219/2614; H05B 1/0244; H05B 1/0283; H03K 17/0822
See application file for complete search history.

(56) References Cited

U.S. PATENT DOCUMENTS

| 4,093,847 | A | * | 6/1978 | Walker | F24H 15/269 392/318 |
| 5,443,206 | A | * | 8/1995 | Cohen | F24D 19/1066 236/78 D |
| 6,861,621 | B2 | | 3/2005 | Ghent | |
| 6,913,203 | B2 | | 7/2005 | DeLangis | |
| 6,943,325 | B2 | | 9/2005 | Pittman et al. | |
| 7,020,386 | B2 | | 3/2006 | Scime et al. | |
| 7,032,543 | B1 | | 4/2006 | Akkala et al. | |

(Continued)

*Primary Examiner* — Tiffany T Tran
(74) *Attorney, Agent, or Firm* — Eversheds Sutherland (US) LLP

(57) ABSTRACT

An energy cutoff apparatus for a water heating system includes a safety cutoff circuit and a presence detection circuit. The safety cutoff circuit receives a temperature signal from a temperature sensor. The temperature signal is indicative of whether a temperature of water in the water heating system within a permissible temperature range. The safety cutoff circuit disables a safe operation current branch when the temperature signal indicates the water temperature is outside the permissible water temperature range. The presence detection circuit detects a presence of the temperature sensor and disables a presence detection current branch if the temperature sensor is absent. Switches can power heating elements of the water heating system responsive to the safe operation current branch being enabled and the temperature sensor being present and can disable the heat elements responsive to the safe operation current branch being disabled or the temperature sensor being absent.

20 Claims, 4 Drawing Sheets

(56) References Cited

U.S. PATENT DOCUMENTS

| | | | |
|---|---|---|---|
| 7,096,828 B2 | 8/2006 | Tippmann | |
| 7,163,157 B2 | 1/2007 | Goncze et al. | |
| 7,201,181 B1 | 4/2007 | Daugherty et al. | |
| 7,221,862 B1* | 5/2007 | Miller | H05B 1/0283 392/497 |
| 7,240,850 B2 | 7/2007 | Beck et al. | |
| 7,298,968 B1 | 11/2007 | Boros et al. | |
| 7,337,752 B2 | 3/2008 | Boros et al. | |
| 7,390,413 B2 | 6/2008 | Zentner et al. | |
| 7,421,784 B2 | 9/2008 | Akkalla et al. | |
| 7,445,024 B2 | 11/2008 | Paterson et al. | |
| 7,451,725 B2 | 11/2008 | Garrabrant et al. | |
| 7,458,520 B2 | 12/2008 | Belz et al. | |
| 7,513,221 B2 | 4/2009 | Akkala et al. | |
| 7,528,392 B2 | 5/2009 | England et al. | |
| 7,556,061 B2 | 7/2009 | Morita et al. | |
| 7,669,776 B2 | 3/2010 | Beck et al. | |
| 7,744,007 B2 | 6/2010 | Beagen et al. | |
| 7,770,807 B2 | 8/2010 | Robinson et al. | |
| 7,770,808 B2 | 8/2010 | Ruga et al. | |
| 7,773,868 B2 | 8/2010 | Moore | |
| 7,850,088 B2 | 12/2010 | Wei et al. | |
| 7,905,424 B2 | 3/2011 | Li et al. | |
| 7,913,926 B2 | 3/2011 | Goncze | |
| 7,971,796 B2 | 7/2011 | Roques | |
| 7,982,164 B2 | 7/2011 | Lopez et al. | |
| 8,043,556 B2 | 10/2011 | Peel et al. | |
| 8,074,894 B2 | 12/2011 | Beagen | |
| 8,162,236 B2 | 4/2012 | Rodenbeck et al. | |
| 8,167,215 B2 | 5/2012 | Sansum et al. | |
| 8,175,752 B2 | 5/2012 | Deivasigamani et al. | |
| 8,176,937 B2 | 5/2012 | Zhang et al. | |
| 8,181,886 B2 | 5/2012 | Li et al. | |
| 8,245,987 B2 | 8/2012 | Hazzard et al. | |
| 8,271,143 B2 | 9/2012 | Deivasigamani et al. | |
| 8,286,595 B2 | 10/2012 | Cerney et al. | |
| 8,291,930 B2 | 10/2012 | Lee | |
| 8,353,462 B2 | 1/2013 | Todaka et al. | |
| 8,375,934 B2 | 2/2013 | Zheng | |
| 8,375,990 B2 | 2/2013 | Veros | |
| 8,414,748 B2 | 4/2013 | Carson et al. | |
| 8,437,626 B2 | 5/2013 | Ding et al. | |
| 8,443,823 B1 | 5/2013 | Prager | |
| 8,469,054 B2 | 6/2013 | Lang et al. | |
| 8,485,178 B2 | 7/2013 | Diaz et al. | |
| 8,500,035 B2 | 8/2013 | Goncze | |
| 8,776,733 B2 | 7/2014 | Haddad et al. | |
| 8,839,636 B2 | 9/2014 | Hamada et al. | |
| 8,910,880 B2 | 12/2014 | Farrell | |
| 8,944,013 B2 | 2/2015 | Min | |
| 8,965,584 B2 | 2/2015 | Deivasigamani et al. | |
| 9,122,284 B2 | 9/2015 | Ferguson | |
| 9,124,098 B2 | 9/2015 | Broniak et al. | |
| 9,151,506 B2 | 10/2015 | Ru et al. | |
| 9,194,606 B2 | 11/2015 | Braathen | |
| 9,220,658 B2 | 12/2015 | Eveleigh et al. | |
| 9,244,466 B2 | 1/2016 | DuPlessis et al. | |
| 9,249,988 B2 | 2/2016 | Huang et al. | |
| 9,268,342 B2 | 2/2016 | Beyerle et al. | |
| 9,273,450 B2 | 3/2016 | Peel | |
| 9,285,807 B2 | 3/2016 | Rodenbeck et al. | |
| 9,310,098 B2 | 4/2016 | Buescher et al. | |
| 9,310,813 B2 | 4/2016 | Farris et al. | |
| 9,316,412 B2 | 4/2016 | Giamati | |
| 9,423,153 B2 | 8/2016 | Nguyen et al. | |
| 9,464,414 B2 | 10/2016 | Shapira | |
| 9,464,805 B2 | 10/2016 | Smelcer | |
| 9,575,495 B2 | 2/2017 | Hefley | |
| 9,599,364 B2 | 3/2017 | Bahar et al. | |
| 9,632,514 B2 | 4/2017 | Marty et al. | |
| 9,638,439 B2 | 5/2017 | Shaffer et al. | |
| 9,650,769 B2 | 5/2017 | Peel | |
| 9,650,770 B2 | 5/2017 | Peel | |
| 9,664,425 B2 | 5/2017 | Tsai | |
| 9,696,043 B2 | 7/2017 | Ward et al. | |
| 9,715,238 B2 | 7/2017 | Rodenbeck et al. | |
| 9,732,866 B2 | 8/2017 | Dolgos | |
| 9,732,983 B2 | 8/2017 | Zeller et al. | |
| 9,739,392 B2 | 8/2017 | Shaffer et al. | |
| 9,752,798 B2 | 9/2017 | Buescher et al. | |
| 9,758,950 B2 | 9/2017 | Peel | |
| 9,758,951 B2 | 9/2017 | Evans et al. | |
| 9,765,990 B2 | 9/2017 | Wickelmaier et al. | |
| 9,771,707 B2 | 9/2017 | Lin et al. | |
| 9,783,964 B2 | 10/2017 | Thompson et al. | |
| 9,863,128 B2 | 1/2018 | Yuan et al. | |
| 9,885,497 B2 | 2/2018 | Ward et al. | |
| 9,897,333 B2 | 2/2018 | Ru et al. | |
| 9,909,288 B2 | 3/2018 | Peel | |
| 9,920,507 B2 | 3/2018 | Peel | |
| 9,920,953 B2 | 3/2018 | Ward et al. | |
| 9,938,700 B2 | 4/2018 | Shaw et al. | |
| 9,939,172 B2 | 4/2018 | Qiu et al. | |
| 9,945,103 B2 | 4/2018 | Thompson et al. | |
| 9,957,699 B2 | 5/2018 | Peel | |
| 9,957,700 B2 | 5/2018 | Peel | |
| 9,958,075 B2 | 5/2018 | Rowe et al. | |
| 9,963,859 B2 | 5/2018 | Mainka et al. | |
| 9,964,315 B1 | 5/2018 | Ziehm | |
| 9,970,681 B2 | 5/2018 | Ward et al. | |
| 10,001,289 B2 | 6/2018 | Mowris | |
| 10,041,232 B2 | 8/2018 | Lorentz | |
| 10,047,974 B1 | 8/2018 | Riblet et al. | |
| 10,066,372 B2 | 9/2018 | Chicurel | |
| 10,066,841 B2 | 9/2018 | Ng et al. | |
| 10,082,301 B1 | 9/2018 | Shaffer | |
| 10,088,852 B2 | 10/2018 | Hazzard et al. | |
| 10,139,135 B1 | 11/2018 | Lesage | |
| 10,184,232 B2 | 1/2019 | Veros et al. | |
| 10,203,132 B2 | 2/2019 | Cho et al. | |
| 10,209,721 B2 | 2/2019 | Ward et al. | |
| 10,240,816 B2 | 3/2019 | Whitehouse et al. | |
| 10,254,009 B2 | 4/2019 | Pan | |
| 10,267,022 B2 | 4/2019 | Veros et al. | |
| 10,274,104 B2 | 4/2019 | Farris et al. | |
| 10,278,536 B2 | 5/2019 | Chen | |
| 10,281,351 B2 | 5/2019 | Branecky et al. | |
| 10,288,317 B2 | 5/2019 | Cool | |
| 10,316,981 B2 | 6/2019 | Ward et al. | |
| 10,378,674 B2 | 8/2019 | Hanazono et al. | |
| 10,407,881 B1 | 9/2019 | Javier | |
| 10,466,727 B2 | 11/2019 | Shaffer et al. | |
| 10,480,825 B1 | 11/2019 | Riblet et al. | |
| 10,494,798 B2 | 12/2019 | Peel | |
| 10,501,915 B2 | 12/2019 | Peel | |
| 10,538,902 B2 | 1/2020 | Searcy | |
| 10,604,399 B2 | 3/2020 | Lee et al. | |
| 10,604,919 B2 | 3/2020 | Peel | |
| 10,605,486 B2 | 3/2020 | Chaudhry et al. | |
| 10,647,177 B2 | 5/2020 | Yano et al. | |
| 10,698,429 B2 | 6/2020 | Rodenbeck et al. | |
| 10,718,530 B2 | 7/2020 | Johnson et al. | |
| 10,801,752 B1* | 10/2020 | Laurencio Molino | F24H 9/1818 |
| 10,823,457 B2 | 11/2020 | Zhou et al. | |
| 10,823,458 B1 | 11/2020 | Riblet et al. | |
| 10,845,049 B2 | 11/2020 | Gu et al. | |
| 10,852,008 B2 | 12/2020 | Daniels et al. | |
| 10,876,742 B2 | 12/2020 | Tadmor | |
| 10,876,766 B2 | 12/2020 | Ng | |
| 10,889,389 B2 | 1/2021 | Boyle et al. | |
| 10,907,860 B2 | 2/2021 | Fabrizio | |
| 10,921,025 B2 | 2/2021 | Shaffer, Jr. et al. | |
| 10,983,540 B2 | 4/2021 | Eveleigh et al. | |
| 11,009,260 B2 | 5/2021 | Knoeppel | |
| 11,079,139 B2 | 8/2021 | Branecky | |
| 11,112,367 B2 | 9/2021 | Wang et al. | |
| 11,118,812 B1 | 9/2021 | Riblet et al. | |
| 11,125,468 B2 | 9/2021 | Wan et al. | |
| 11,142,923 B2 | 10/2021 | Dzindo | |
| 11,259,669 B2 | 3/2022 | Popper | |
| 11,262,084 B2 | 3/2022 | Chaudhry et al. | |
| 11,268,706 B2 | 3/2022 | Colon et al. | |
| 11,287,160 B2 | 3/2022 | Scott et al. | |

(56) References Cited

U.S. PATENT DOCUMENTS

| | | | |
|---|---|---|---|
| 11,293,668 B2 | 4/2022 | Shaffer et al. | |
| 11,326,809 B1 | 5/2022 | Tsai et al. | |
| 11,332,912 B2 | 5/2022 | Vetterli et al. | |
| 11,347,246 B2 | 5/2022 | Goodjohn et al. | |
| 11,359,823 B2 | 6/2022 | Zhang | |
| 11,396,467 B2 | 7/2022 | D'Amore et al. | |
| 11,397,009 B2 | 7/2022 | D'Amore et al. | |
| 11,402,126 B1 | 8/2022 | Riblet et al. | |
| 2007/0177857 A1* | 8/2007 | Troost | F24H 15/31 392/345 |
| 2007/0194009 A1* | 8/2007 | Seger | H05B 1/0236 123/434 |
| 2007/0246556 A1* | 10/2007 | Patterson | F24H 9/2014 237/8 A |
| 2017/0059208 A1* | 3/2017 | Chaudhry | F24H 15/132 |
| 2017/0307257 A1* | 10/2017 | Braun | A47K 10/48 |
| 2018/0106501 A1* | 4/2018 | Hinton | F24H 15/37 |
| 2018/0119988 A1 | 5/2018 | Nolte et al. | |
| 2018/0120872 A1* | 5/2018 | Hill | G08B 7/06 |
| 2020/0040556 A1 | 2/2020 | Duenas Ladron de Guevara | |
| 2020/0056791 A1 | 2/2020 | Collins | |
| 2020/0158002 A1 | 5/2020 | Lee | |
| 2020/0224927 A1 | 7/2020 | Chaudhry et al. | |
| 2020/0308814 A1 | 10/2020 | Chen et al. | |
| 2020/0326734 A1 | 10/2020 | Rodenbeck et al. | |
| 2020/0348017 A1 | 11/2020 | Shah et al. | |
| 2020/0355399 A1 | 11/2020 | Wick | |
| 2020/0361758 A1 | 11/2020 | Fantappie et al. | |
| 2020/0369532 A1 | 11/2020 | Wolf | |
| 2020/0386440 A1 | 12/2020 | Nolte | |
| 2021/0018222 A1 | 1/2021 | Boros et al. | |
| 2021/0048223 A1 | 2/2021 | Anderson et al. | |
| 2021/0048225 A1 | 2/2021 | Hazzard et al. | |
| 2021/0048226 A1 | 2/2021 | Hazzard et al. | |
| 2021/0131079 A1 | 5/2021 | Eveleigh et al. | |
| 2021/0157346 A1 | 5/2021 | Oglesbee et al. | |
| 2021/0207848 A1 | 7/2021 | Xu et al. | |
| 2021/0231347 A1 | 7/2021 | Vahaba | |
| 2021/0277636 A1 | 9/2021 | Linker et al. | |
| 2021/0278009 A1 | 9/2021 | Wang et al. | |
| 2021/0285659 A1 | 9/2021 | Qin | |
| 2021/0318031 A1 | 10/2021 | Bolognue | |
| 2021/0325919 A1 | 10/2021 | Hutchison et al. | |
| 2021/0381698 A1 | 12/2021 | Erhardt et al. | |
| 2022/0003430 A1 | 1/2022 | Murakami | |
| 2022/0018575 A1 | 1/2022 | Forrester, Jr. | |
| 2022/0018576 A1 | 1/2022 | Zimmer et al. | |
| 2022/0034075 A1 | 2/2022 | Tzeng | |
| 2022/0042686 A1 | 2/2022 | Dettmering et al. | |
| 2022/0049483 A1 | 2/2022 | Montgomery et al. | |
| 2022/0098839 A1 | 3/2022 | Tzeng | |
| 2022/0107093 A1 | 4/2022 | D'Amore et al. | |
| 2022/0120217 A1 | 4/2022 | Ashton et al. | |
| 2022/0178555 A1 | 6/2022 | Chaudhry et al. | |
| 2022/0180383 A1 | 6/2022 | Arrojula | |
| 2022/0186472 A1 | 6/2022 | D'Amore et al. | |
| 2022/0196249 A1 | 6/2022 | Lesage | |
| 2022/0196286 A1 | 6/2022 | Lesage et al. | |
| 2022/0196287 A1 | 6/2022 | Porwal et al. | |
| 2022/0214077 A1 | 7/2022 | Scott et al. | |
| 2022/0235968 A1 | 7/2022 | Shaffer et al. | |
| 2022/0251861 A1 | 8/2022 | Vaughn et al. | |

\* cited by examiner

ELECTRONIC TEMPERATURE LIMITING CONTROL

BACKGROUND

Water heating systems are tasked with two types or categories of temperature controls. A first, user temperature selection, regulates the operating temperature range according to preferences (e.g., a hottest desired temperature or the electrical costs of maintaining the desired range). The second are manufacturer implemented safety features, which limit the temperature of system components to prevent overheating, fires, or other safety hazards. Often times, the two functions are managed independently with two separate mechanisms.

Temperature limiting devices frequently rely on an electro-mechanical device consisting of a bi-metal disc construction. The device uses metallic disc deformation at specified temperatures to open electrical contacts mechanically. While this approach is a mature technology with widespread implementation across consumer appliances, its downside is typically large physical dimensions. Another drawback to this electro-mechanical approach is the integration of the temperature sensing and high-power switching in a single package, which routes high-power wiring to the physical location of any completed temperature measurement.

In light of these and other drawbacks, improvements to temperature limiting controls would be advantageous.

SUMMARY

The present application relates to water heating systems, and more specifically to an energy cutoff apparatus used in those water heating systems. The disclosed technology includes an energy cutoff apparatus that can include a temperature sensor, a safety cutoff circuit, and a presence detection circuit. The safety cutoff circuit can receive a temperature signal or temperature data from the temperature sensor, where the temperature signal is indicative of the temperature sensor sensing a temperature of water in the water heating system within a permissible temperature range or outside the permissible temperature range. The safety cutoff circuit can perform cutoff actions when the water temperature is outside the permissible water temperature range. The presence detection circuit of the energy cutoff apparatus can detect a presence of the temperature sensor and can enable a presence detection current branch upon detection of the temperature sensor. One or more switches can power heating elements of the water heating system in response to enablement of the presence detection current branch and in the absence of cutoff actions.

The temperature sensor can be located remotely from the safety cutoff circuit and the presence detection circuit. The temperature sensor can be located in proximity to a water storage tank of the water heating system and the safety cutoff circuit and the presence detection circuit are external to the water heating system. The temperature sensor can be located in a thermal well of the water storage tank.

The safety cutoff circuit can comprise a plurality of switching components connected in series. A first switching component from among the plurality can be configured to receive the temperature signal as input and a second switching component from among the plurality can be configured to receive input from a set of one or more logic gates. At least one logic gate from among the set of logic gates can be configured to receive the temperature signal as at least one input.

The apparatus can include a reset circuit configured to provide, to the safety cutoff circuit, a reset signal responsive to a reset mechanism in communication with the reset circuit. The safety cutoff circuit can be configured to bypass cutoff operations in response to the temperature of water in the water heating system exceeding the permissible temperature range, then returning to the permissible temperature range, and the safety cutoff circuit receiving the reset signal.

The disclosed technology also include water heating systems including the energy cutoff apparatus and methods for operating the same.

BRIEF DESCRIPTION OF THE DRAWINGS

Reference will now be made to the accompanying drawings, wherein.

Figure 1:
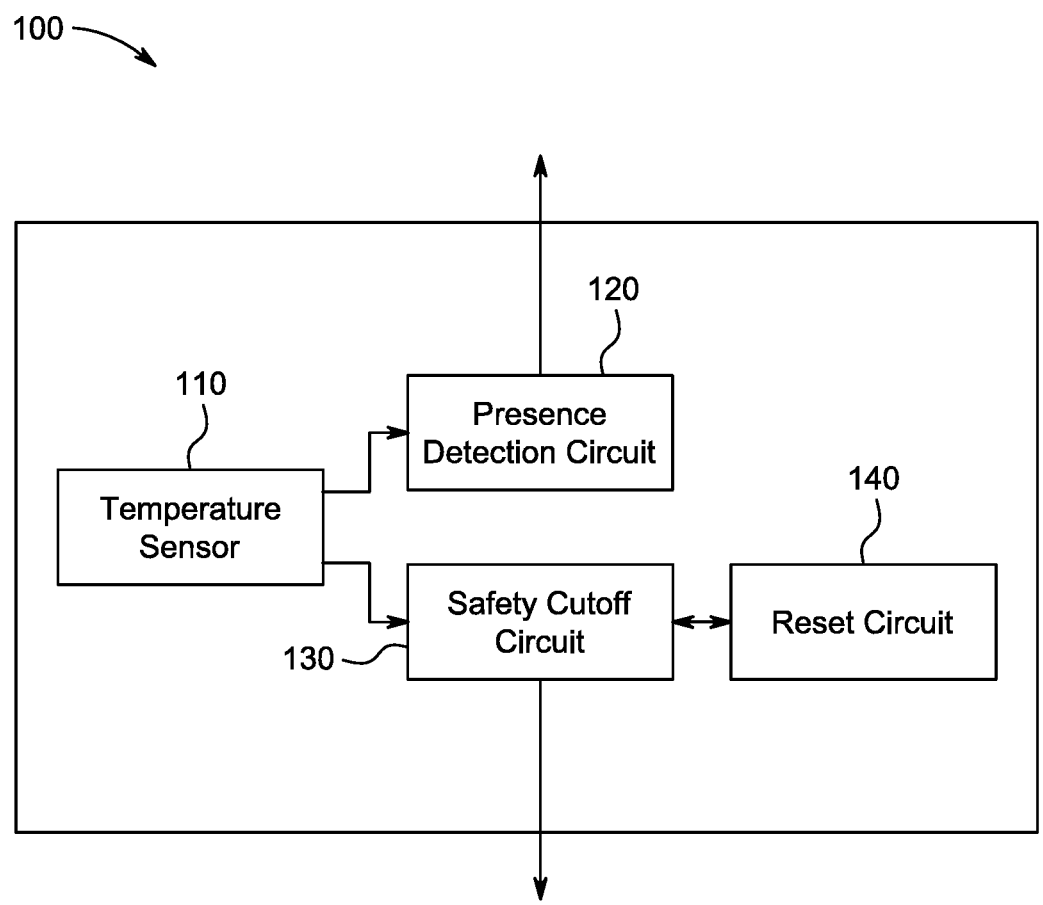
FIG. 1 illustrates an energy cutoff apparatus, according to the disclosed technology.

The drawings illustrate only example embodiments and are therefore not to be considered limiting in scope. The elements and features shown in the drawings are not necessarily drawn to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF THE DRAWINGS

Aspects of the present application eliminate the bi-metal disc component and the associated electrical contacts of conventional energy cutoff (ECO) mechanisms. For example, one or more thermistors can be combined with a variety of logic elements, common power relays, and a variety of passive components required for the operation of the various devices, including water heaters and water heating systems. By using these components, rather than the bi-metal disc structures of typical water tank storage systems, the space required to implement the safety shutoff can be reduced. In addition, this implementation provides improved performance when used with non-metallic tanks (e.g., greater accuracy, better response time, etc.).

The temperature-sensing components of the disclosed systems and methods also need not be integrated into the high-power switching elements of the system, as those two functions can be implemented in different areas. Thus, temperature sensing that is "remote" from the power switching elements, such as the power relays, can overcome some of the above-mentioned drawbacks by providing more flexibility in component placement. Moreover, the disclosed embodiments can also be integrated safely and effectively with temperature control functions and circuitry. Additionally, the disclosed technology can provide redundancy in safety features, while avoiding potentially difficult software update procedures.

Several organizations and testing laboratories provide standards to encourage adoption of certain safety features across technologies. The safety cutoff circuit of the disclosed embodiments can implement additional layers of safety and redundancy by receiving the temperature signal at multiple points within the circuit. Because the temperature signal provides input to these various stages of the circuit(s), a safety cutoff condition can occur even if any of the stages fail to receive the input.

The disclosed technology can use switching components, such as transistors, to enable powering of the heating elements of the water heating system. To overcome the large footprint found in conventional approaches, smaller electronic components such as typical metal oxide semiconductor field effect transistors (MOSFETs), bipolar junction transistors (BJTs), or other conventional elements can perform the control functions, isolated from the power-intensive elements (e.g., relays, heating coils, etc.). The switching components can be arranged serially, so that deactivation of any of the switching components disables heating elements of the water heating system. Multiple switching components can be used within the same circuit to provide additional redundancy and fault tolerance.

While deviation from the acceptable temperature range causes cutoff operations to be performed and de-energizes the circuit, detection of temperature values that have returned to the acceptable range along with receiving a reset signal can be used to re-energize the heating elements. Conditioning the energizing of heating elements on the presence of the temperature signal can prevent a false reading below the permissible temperature range simply because the sensor is absent. For example, the circuitry can be configured such that lack of a signal indicates temperatures have exceeded the permissible range. In this state, if the signal were to reappear within the permissible range, the requirement of actuating the reset mechanism to re-energize the heating elements can provide an additional layer of safety and redundancy.

FIG. 1 is a block diagram representing an energy cutoff apparatus 100, according to the disclosed technology. Energy cutoff apparatus 100 can include a temperature sensor 110, a presence detection circuit 120, a safety cutoff circuit 130, and/or a reset circuit 140. Temperature sensor 110 can be in electrical communication with presence detection circuit 120 and safety cutoff circuit 130. Safety cutoff circuit 130 can be in electrical communication with presence detection circuit 120 and reset circuit 140, in addition to temperature sensor 110.

Each of temperature sensor 110, presence detection circuit 120, safety cutoff circuit 130, and reset circuit 140 is shown within a single box. However, one of skill in the relevant arts will recognize that the physical arrangement, borders, and scale of all elements are simplified in the drawings in order to represent energy cutoff apparatus 100 conceptually for complete understanding of the disclosure. In implementation, temperature sensor 110 can be located remotely from one or both of presence detection circuit 120 and safety cutoff circuit 130.

For example, temperature sensor 110 can be located in proximity to a water storage tank of a water heating system. For example, temperature sensor 110 can be located in a thermal well of the water storage tank (i.e., a closed area surrounded by the tank contents but isolated from the water contained inside). In the case of non-metallic tank water heating systems, the added flexibility of sensor placement can enable designs with the advantages listed above (with respect to measurement accuracy, response time, etc.). Alternatively or additionally, temperature sensor 110 can be located directly in physical contact on a tank wall of a water storage tank (e.g., metal tank implementations).

Temperature sensor 110 can be a component for sensing temperature that produces an electrical signal relative to temperature, such as a thermistor, rather than a physical deformation due to heat (such as found in conventional bi-metallic ECOs). Other examples of suitable temperature sensors include, but are not limited to, resistance temperature detectors (RTDs) or thermocouples. As shown in FIG. 1, temperature sensor 110 can provide an output to presence detection circuit 120 and safety cutoff circuit 130. Temperature sensor 110 can be configured such that current flows when temperatures detected by the sensor is within the temperature range and current does not flow when the temperature is outside of the permissible range. Alternatively, the reverse is true with current flowing when temperatures outside of the temperature range and no current flowing when detected temperatures are within the permissible range. Either type of sensor may be used as outlined above and below.

Temperature sensor 110 can generate a temperature signal or temperature data (e.g., a signal) indicative of sensing a temperature of water in the water heating system that is within a permissible temperature range or outside the permissible temperature range with this flow (i.e., equivalent to a binary on/off or 0/1 based on the sensed temperature). For example, temperature sensor 110 can be configured to detect temperatures in a permissible range between 10 and 80 degrees Celsius. Alternatively, temperature sensor 110 can be configured to detect temperatures in a permissible range between 5 and 85 degrees Celsius, in a permissible range between 10 and 85 degrees Celsius, or in a permissible range below 90 degrees Celsius.

As shown in FIG. 1, presence detection circuit 120 can be in electrical communication with temperature sensor 110. Presence detection circuit 120 can be configured to detect a presence of temperature sensor 110. Upon detection of temperature sensor 110, presence detection circuit 120 can be configured to enable a presence detection current branch, which is shown in FIG. 1 as an output from presence detection circuit 120.

Presence detection circuit 120 can be implemented in a number of ways to detect the presence of temperature sensor 110. For example, presence detection circuit 120 can include a switching component, such as a metal oxide semiconductor field effect transistor (MOSFET), and other passive or active logic components. Presence detection circuit 120 can be implemented with a single switching component configured to receive output from temperature sensor 110. Other types of switching devices, logic components, or circuit schematics for detecting the presence of temperature sensor 110 can be used.

When the presence detection circuit 120 enables the presence detection current branch, based on temperature sensor 110 being detected, current can be delivered to other elements of the water heating system. As such, the water heating system can be safely operated. When temperature sensor 110 is not detected, due to its absence or another fault in providing the temperature signal, heating elements of the water heating system do not receive power. In this way, presence detection circuit 120 can provide a redundant failsafe to safety cutoff circuit 130.

As noted previously, temperature sensor 110 can provide an output to safety cutoff circuit 130. Responsive to receiving at least the temperature signal (i.e., output from temperature sensor 110) indicating that the water temperature is outside the permissible water temperature range, safety cutoff circuit 130 can perform cutoff actions (e.g., prevent the flow of electricity to one or more components). This is depicted in FIG. 1 as an output from safety cutoff circuit 130. In instances when safety cutoff circuit 130 has performed the cutoff operations, the safety cutoff circuit can cut off current to other elements of the water heating system due to overheating. Thus, the water heating system is no longer operating.

Safety cutoff circuit 130 can include a plurality of switching components connected in series. For example, the plurality of switching components can include transistors, such as MOSFETs. The switching components can be CMOS (complementary MOS) transistors, NMOS (negative MOS) transistors, or PMOS (positive MOS) transistors. The plurality of switching components are bipolar junction transistors (BJTs). Other switching components can be used in alternative embodiments.

By using the plurality of switching components connected in series, safety cutoff circuit 130 provides additional layers of redundancy and safety for a water heating system. For example, only a single switching component need receive an indication of overheating (i.e., the temperature sensor outside an acceptable temperature range) to cut off current to heating elements of the water heating system. In this way, there are multiple points at which the safety cutoff can occur for system redundancy. Likewise, the failure of any single switching component can prevent power from reaching heating elements for added safety through redundancy. No single component needs to function for the safety cutoff, thus adding fault tolerance to the system.

Safety cutoff circuit 130 and presence detection circuit 120 can be external to the water heating system. For example, safety cutoff circuit 130 and presence detection circuit 120 can be housed as part of an overall control system for the water heating system. Such an overall control system housing can include additional circuitry for controlling the water heating system in normal operation (i.e., temperature regulation circuits, input and output (I/O) circuitry, I/O mechanisms, displays, buttons/keypads, etc.).

Each of the housed circuits can be part of a single printed circuit board (PCB) or integrated package. Alternatively, each circuit can be isolated on individual PCBs to allow for replacement of individual circuits/components. Regardless of specific placement and arrangement, the circuitry and control functions of the ECO can be implemented with less overall spatial footprint, and without need for high-power wiring routed specifically to the measurement point, amongst other advantages.

Responsive to the presence detection current branch and the absence of cutoff operations, one or more switches can supply current to heating elements located elsewhere in the water heating system. The overall control system for the water heating system can be located on an external surface of the water heating storage tank and the temperature sensor connected via wiring elsewhere in the system. The control system can be on an adjacent surface in electrical communication with other components and aspects of the water heating system.

The status of safety cutoff apparatus 100 can be displayed on the overall control system. Alternatively or additionally, that status can be shared via other means, such as a monitoring application available on a computing device (e.g., personal computer, laptop computer, smartphone, home monitoring system, artificial intelligence device/agent, etc.) accessed through a wired or wireless connection (e.g., directly wired, local access network (LAN), wireless LAN, internet access, cloud-delivered services, etc.).

Reset circuit 140 shown in FIG. 1 can be in electrical communication with safety cutoff circuit 130 and can be configured to provide a reset signal to safety cutoff circuit 130. The reset signal can be responsive to operation of a reset mechanism in communication with the reset circuit. The reset mechanism can be a reset button located on the water heating system. For example, the reset button can be an I/O button located as part of the overall control system and integrated within that single housing. A reset button can be located separately from the overall control system to draw attention to its safety function (i.e., as opposed to controls for normal operation). The reset signal can be responsive to a press and release operation, so as to meet particular UL safety standards. Other forms of two-step actuation are contemplated within the scope of the reset operation.

Safety cutoff circuit 130 can be configured to enable the safe operation of the system responsive to a reset condition. After the temperature of water in the water heating system exceeds the permissible temperature range, triggering cutoff operations, the reset can be performed. Once the temperature of water in the water heating system returns to the permissible temperature range and the reset signal has been received, reset circuit 140 can provide the reset signal to safety cutoff circuit 130 in such manner as to enable the safe operation once again.

Based on the above, energy cutoff apparatus 100 can provide multiple levels of redundancy, fault tolerance and safety, while doing so in less space. With flexible possibilities for implementation, a number of inexpensive and commercially available components can be used to construct the disclosed apparatus rather than using high-power wired components having rigid placement requirements. The disclosed technology can also eliminate the need for software updates and/or can avoid protocol compatibility issues, based on the hardware-oriented circuit approach.

Figure 2:
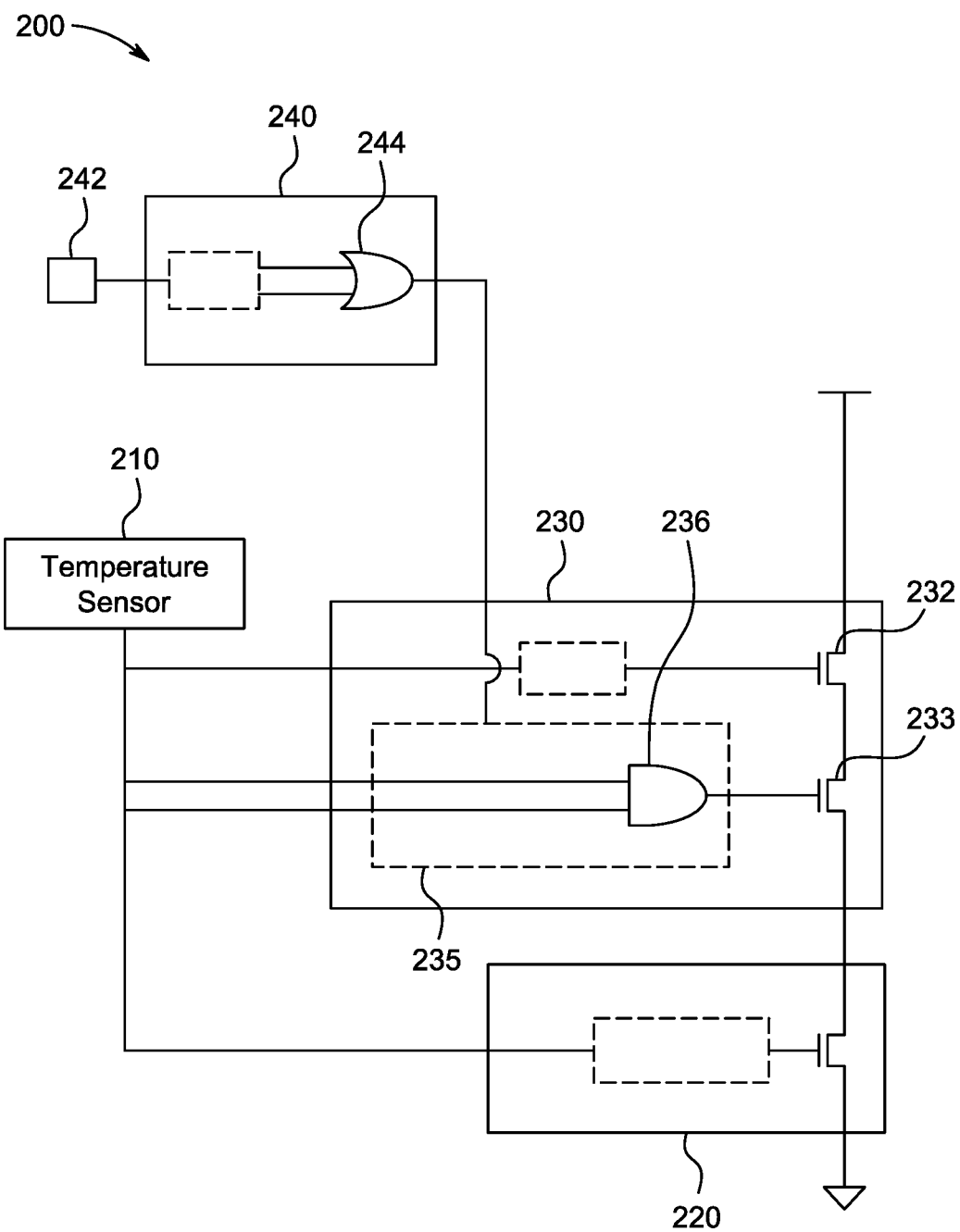
FIG. 2 represents a simplified circuit diagram of an energy cutoff apparatus, according to the disclosed technology.

FIG. 2 shows a simplified circuit diagram 200 of an energy cutoff apparatus according to the disclosed technology. Portions of circuit diagram 200 correspond to circuits and components as described above with respect to FIG. 1. A temperature sensor 210, a presence detection circuit 220, a safety cutoff circuit 230 and a reset circuit 240 can be identical or substantially similar to temperature sensor 110, presence detection circuit 120, safety cutoff circuit 130 and reset circuit 140. Operations, connections, and interactions between the various circuits can be identical or substantially similar as described above and below, but contemplate variations and modifications as well.

Various logic and signaling components, such as digital logic gates (e.g., OR and AND gates) and resistors are depicted in FIG. 2. Simplified circuit diagram 200 uses standard notation for such components where applicable. While certain components are shown for understanding of the present disclosure, one of skill in the relevant art will understand that additional components may be used in conjunction with the illustrated circuits, such as capacitors, operational amplifiers ("op amps"), or additional digital logic gates (such as NOT, NOR, NAND, or XOR gates). Various boxes with dashed lines, shown without reference numerals, are added to the figure to show portions of the circuit which may or may not include such additional components.

Temperature sensor 210 can be in electrical communication with presence detection circuit 220 and safety cutoff circuit 230. Temperature sensor 210 can be a thermistor, RTD, thermocouple or similar mechanism. Temperature sensor 210 can be located in close proximity to, or remotely from, presence detection circuit 220 and safety cutoff circuit 230. Again, temperature sensor 210 can be smaller, segregated from high-power wiring, and flexibly placed. Advantageously for water heating systems of varying materials (i.e., water heating systems employing non-metallic tanks as well as metallic tanks), temperature sensor 210 can be placed to optimize accuracy, performance characteristics, and the like.

As shown in FIG. 2, presence detection circuit 220 can be implemented with a single switching component wired in parallel with a resistor. For example, the switching component can be a PMOS transistor, used in tandem with a resistor of appropriate resistance properties. In some embodiments, the switching component is a different type of MOSFET, or an altogether different type of transistor (e.g., BJT). Presence detection circuit 220 can be implemented with a different switching component and/or additional active or passive elements as will be understood by one of skill in the relevant arts. The switching element of presence detection circuit 220 can enable the flow of current to one or more switching elements configured to power the heating elements of the water heating system, e.g., one or more relays.

As shown in FIG. 2, safety cutoff circuit 230 can include a plurality of switching components 232, 233 wired in series. A first switching component 232 from among the plurality of switching components in safety cutoff circuit 230 can receive temperature signal as input. As an example, first switching component 232 can be a PMOS transistor configured to receive the temperature signal directly as a gate input (with or without one or more passive circuit components, such as resistors, disposed between temperature sensor 210 and the gate). First switching component 232 can be implemented with various types of FETs, different transistors, or with alternative switching components.

A second switching component 233 from among the plurality of switching components in safety cutoff circuit 230 can receive input from a set of one or more logic gates 235. The precise composition and arrangement of set 235 can vary as will be understood by one of skill in the relevant arts. At least one logic gate 236 from among the set of logic gates, shown as an AND gate for the purposes of illustration, can receive the temperature signal as at least one input. One of skill in the art will recognize that alternative gates can be used without departing from the intended scope of the example (for instance, a NAND gate with oppositely selected logic operations).

Reset circuit 240 is depicted in FIG. 2 connected to a reset button 242, as well as connected to safety cutoff circuit 230 through a second logic gate 244. As shown, second logic gate 244 can be an OR gate, configured to receive the reset signal at its two inputs. Various other active and passive logic components can be disposed between reset button 242 and second logic gate 244 to effectuate the reset sequence. The reset sequence can involve a press and release operation. Thus, the components between reset button 242 and second logic gate 244 can provide the switching and timing associated with such an operation. Other reset operations are contemplated and can be implemented by various arrangements of components.

As mentioned above, the connection of reset circuit 240 to safety cutoff circuit 230 can be through second logic gate 244. This output of reset circuit 240 can be used as an input to set of logic gates 235. The precise arrangement of set of logic gates 235 is not rigid. Thus, any implementation that allows the above-described reset operation with respect to FIG. 1 to take place after the temperature range has been exceeded is contemplated by the present application.

Figure 3:
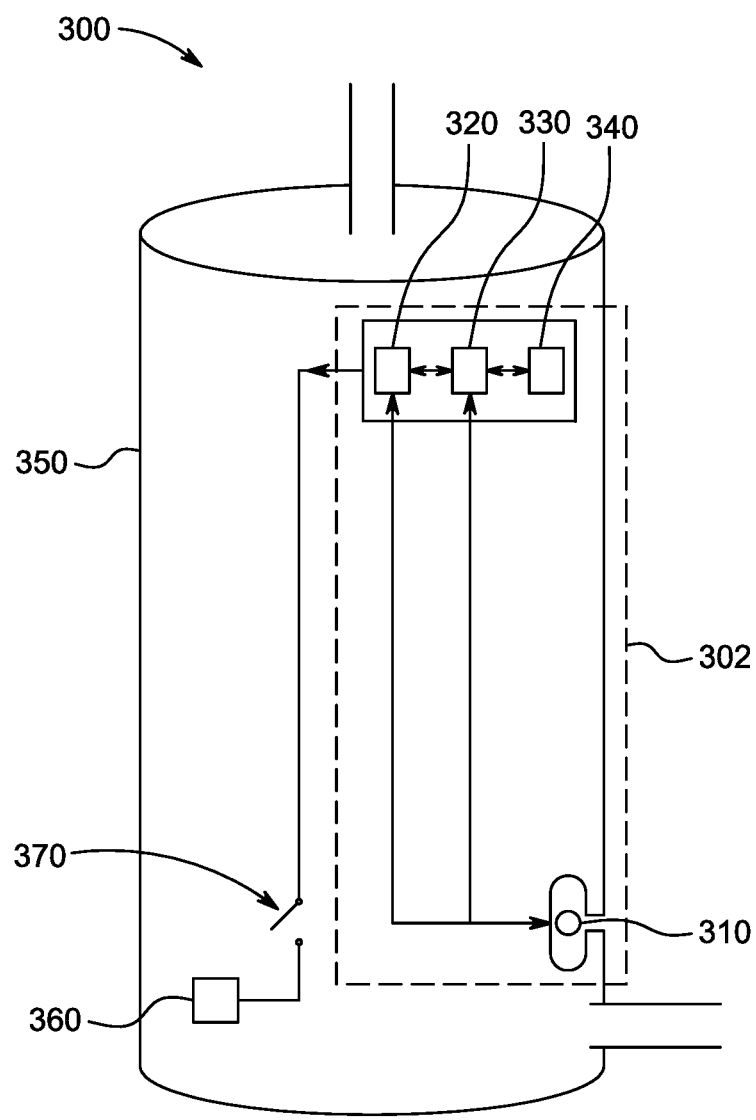
FIG. 3 illustrates a water heating system, according to the disclosed technology.

FIG. 3 illustrates a water heating system 300 according to the disclosed technology. An energy cutoff apparatus 302, which can have a temperature sensor 310, presence detection circuit 320, a safety cutoff circuit 330 and a reset circuit 340, is included in water heating system 300. Energy cutoff apparatus 302 can be identical or substantially similar to energy cutoff apparatus 100 and/or 200 described above and below, and thus its configuration, operation or other general description will not be repeated here, when possible, for the sake of brevity and clarity. In addition, water heating system 300 can include a water storage tank 350, one or more heating elements 360, and one or more energizing switches 370.

Water storage tank 350 is a tank used for the storage and heating of water in the water heating system. Water storage tank 350 can be a composite construction of fiberglass and plastic. Water heater storage tank 350 can be entirely made of plastic or entirely made of fiberglass. Alternatively, water storage tank 350 can have a metallic construction (e.g., steel) and can be lined with an insulating layer. Other materials can be used to form water storage tank 350.

Heating elements 360 can be located in proximity to water storage tank 350 and configured to heat water in the water storage tank 350. Heating elements 360 can be located within water storage tank 350, in direct contact with the water to be heated. Alternatively or additionally, heating elements 360 can be simply in contact with water storage tank (e.g., an exterior of water storage tank 350) or in other chambers of water storage tank 350 at specified locations to heat water contained within other chambers or sections. Further still, heating elements 360 can be located at an ingress of water storage tank 350 or in a separate construction so as to heat water before it is transferred to water storage tank 350. The particular arrangement of such heating elements can vary significantly and remain within the scope of the above- and below-described embodiments.

Energizing switches 370 can be in electrical communication with energy cutoff apparatus 302 and can be configured to power heating elements 360. Energizing switches 370 can be power relays to deliver current to heating elements 360. Other types of switching devices can also be substituted within the scope of energizing switches 370.

When the presence detection current branch is enabled and in the absence of cutoff operations, energizing switches 370 can receive power. In turn, energizing switches 370 can deliver current to power heating elements 360 when the presence detection current branch is enabled and in the absence of cutoff operations. Conversely, when either the presence detection current branch is disabled or when cutoff operations have been performed, energizing switches 370 receive no power and heating elements 360 receive no power.

For example, a water heating system 300 can use a thermistor as described above and below as temperature sensor 310. When detecting a temperature that exceeds a safe temperature for the tank, e.g., 90 degrees Celsius, electric current to energizing switches 370 can be disabled. Similarly, if temperature sensor 310 is not detected at all by presence detection circuit 320, the electric current can also disabled. In these instances, heating elements 360 receive no power and the water heating system is prevented from overheating.

Continuing with the example, if temperature sensor 310 is detected and the temperature in water storage tank 350 returns a permissible temperature value (i.e., a temperature value within the permissible range of temperatures) through safety cutoff circuit 330, energizing switches 370 can receive power. This permits electric current to flow to heating elements 360, allowing for normal operation of water heating system 300. If the temperature range is exceeded, but subsequently both a reset signal is provided by reset circuit 340 and the temperature returns to acceptable values, normal operation can be restored.

Figure 4:
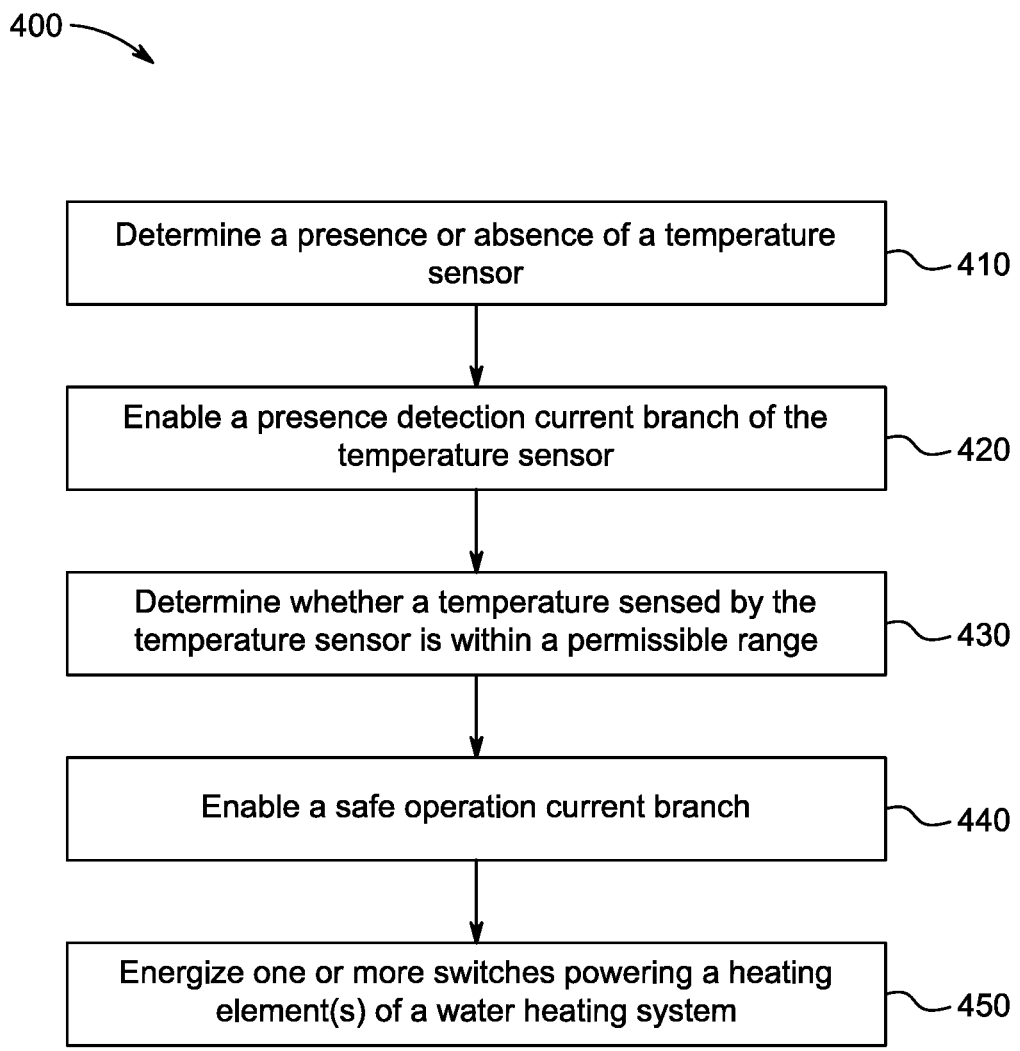
FIG. 4 presents a method of energizing heating elements in a water heating system, according to the disclosed technology.

FIG. 4 is a flowchart representing a method 400 of energizing heating elements in a water heating system according to the disclosed technology. Method 400 can be performed by systems and apparatuses identical or substantially similar to those described in FIGS. 1-3 above. Method 400 provides for a safety cutoff operation in a water heating system without reliance on metal deformation constructions. Instead, low-cost electronic components enable the method. Other advantages can be attained using method 400 as well, such as reducing the area used for the relevant circuitry, enabling better placement of temperature sensors, and using the embodiments in all manner of storage tanks (metal, composite, etc.), amongst other desirable attributes.

At a step 410, a presence or absence of a temperature sensor can be determined by a presence detection circuit. This can be identical or substantially similar to presence detection circuit 220, shown in FIG. 2, detecting presence or absence of temperature sensor 210. At a step 420, a presence detection current branch can be enabled responsive to determining presence of the temperature sensor (e.g., temperature sensor 210).

Whether a temperature sensed by the temperature sensor is within a permissible range or outside the permissible range is determined by a safety cutoff circuit at a step 430. An indication of the sensed temperature can be output by the temperature sensor as a temperature signal (e.g., as a 0 or 1 depending on whether current is flowing due to the sensed temperature falling within or outside of the permissible temperature range). For example, this can be identical or substantially similar to safety cutoff circuit 230 receiving output from temperature sensor 210 as shown in FIG. 2 (or alternatively those described in FIG. 1 or 3). At a step 440, cutoff operations can be performed responsive to the temperature detected by the temperature sensor being outside the permissible range. The temperature detected by the temperature sensor can be sensed remotely from the safety cutoff circuit and the presence detection circuit.

Performing cutoff operations can further include deactivating one or more from among a plurality of switching components arranged in series. The method can include receiving a plurality of inputs, each input corresponding to one of the plurality of switching components, and each switching component can be configured to de-energize the circuit based on the corresponding input and irrespective of the other inputs. A first switching component from among the plurality can be deactivated responsive to receiving as an input the temperature signal indicating the temperature sensed by the temperature sensor is outside the permissible range. As an example, deactivating the first switching component can include receiving a temperature signal from a temperature sensor (e.g., temperature sensor 210) at a transistor gate (for instance, switching component 232), where the temperature signal is indicative of an absence of the temperature sensor, and switching the switching component to de-energize the circuit.

A second switching component (for example, switching component 233) from among the plurality can be deactivated responsive to receiving input from a set of one or more logic gates, the input from the set of one of more logic gates indicating the temperature detected by the temperature sensor is outside the permissible range. Deactivating the second switching component can further include a logic gate among the set of logic gates receiving the temperature signal as at least one input (e.g., similar to gate 236). At a step 450, enablement of the presence detection current branch and the absence of cutoff actions can energize one or more switches that power the heating elements of the water heating system. Alternatively, deactivating the second switching component can include receiving a temperature signal indicative of a measured temperature that is outside the permissible temperature range and switching the second switching component to de-energize the circuit.

Optionally, the method can include generating, by a reset circuit, a reset signal responsive to a reset operation being performed. The reset circuit described with respect to any one of FIGS. 1-3 above are examples in some embodiments. The cutoff operations can also be bypassed responsive to receiving, at the safety cutoff circuit, the reset signal, in conjunction with the sensed temperature exceeding the permissible temperature range and later returning to a permissible temperature.

For example, the method can include receiving three inputs: a temperature sensor presence signal, a temperature value signal, and a reset signal. The method can include de-energizing the entire circuit in response to any one of the inputs being outside the corresponding permissible range (e.g., the temperature sensor presence signal indicates a temperature sensor is not present, the temperature values are outside the permissible range, or the reset signal has not been received following previous de-energization of the circuit). As will be understood, the method can include de-energizing the circuit if any one of these inputs is outside the corresponding permissible range and irrespective of the remaining inputs.

One or more steps of method 400 can be omitted without departing from the scope of this disclosure. Conversely, method 400 can include additional steps other than those expressly described above or shown in FIG. 4 without departing from the scope of this disclosure. Further, some steps of method 400 can be performed in a different order than that expressly described above without departing from the scope of this disclosure.

Although example embodiments are described herein it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An energy cutoff apparatus for a water heating system, the energy cutoff apparatus comprising:
   a safety cutoff circuit in electrical communication with a temperature sensor and configured to:
   receive, from the temperature sensor, a temperature signal indicative of whether a water temperature of water in the water heating system is within a permissible water temperature range;
   enable a safe operation current branch responsive at least in part to the temperature signal indicating that the water temperature is inside the permissible water temperature range; and disable the safe operation current branch responsive to the temperature signal indicating that the water temperature is outside the permissible water temperature range;

wherein the safety cutoff circuit comprises a plurality of transistors comprising a first transistor configured to receive the temperature signal from the temperature sensor as input; and a presence detection circuit in electrical communication with the temperature sensor and the safety cutoff circuit, the presence detection circuit being configured to:

detect whether the temperature sensor is present or absent; and disable a presence detection current branch responsive to detecting that the temperature sensor is absent, wherein one or more switches are configured to:

power heating elements of the water heating system responsive to the safe operation current branch being enabled and the presence detection current branch detecting that the temperature sensor is present; and disable the heating elements responsive to the safe operation current branch being disabled or the presence detection current branch detecting that the temperature sensor is absent.

2. The energy cutoff apparatus of claim 1, wherein the temperature sensor is located remotely from the safety cutoff circuit and the presence detection circuit.

3. The energy cutoff apparatus of claim 2, wherein the temperature sensor is located in proximity to a water storage tank of the water heating system and the safety cutoff circuit and the presence detection circuit are external to the water heating system.

4. The energy cutoff apparatus of claim 3, wherein the temperature sensor is located in a thermal well of the water storage tank.

5. The energy cutoff apparatus of claim 1, wherein the plurality of transistors are connected in series.

6. The energy cutoff apparatus of claim 5, wherein the plurality of further comprises a second transistor configured to receive input from one or more logic gates.

7. The energy cutoff apparatus of claim 6, wherein at least one logic gate from among the one or more logic gates is configured to receive the temperature signal from the temperature sensor as at least one input.

8. The energy cutoff apparatus of claim 1, further comprising a reset circuit in electrical communication with the safety cutoff circuit, the reset circuit being configured to provide, to the safety cutoff circuit, a reset signal responsive to a reset mechanism in communication with the reset circuit, wherein the safety cutoff circuit is configured to enable the safe operation current branch responsive to:

the water temperature in the water heating system returning to the permissible temperature range, and receiving the reset signal.

9. A water heating system comprising:

a water storage tank;

one or more heating elements located in the water storage tank and configured to heat water in the water storage tank;

one or more switches configured to selectively power the one or more heating elements;

a temperature sensor; and an energy cutoff apparatus comprising:

a safety cutoff circuit in electrical communication with the temperature sensor and configured to:

receive, from the temperature sensor, a temperature signal indicative of whether a water temperature of water in the water heating system is within a permissible water temperature range;

enable a safe operation current branch responsive at least in part to the temperature signal indicating that the water temperature is inside the permissible water temperature range; and disable the safe operation current branch responsive to the temperature signal indicating that the water temperature is outside the permissible water temperature range;

wherein the safety cutoff circuit comprises a plurality of transistors comprising a first transistor configured to receive the temperature signal from the temperature sensor as input; and a presence detection circuit in electrical communication with the temperature sensor and the safety cutoff circuit, the presence detection circuit being configured to:

detect whether the temperature sensor is present or absent; and disable a presence detection current branch responsive to detecting that the temperature sensor is absent, wherein the one or more switches are configured to:

power the one or more heating elements responsive to the safe operation current branch being enabled and the presence detection current branch detecting that the temperature sensor is present; and disable the heating elements responsive to the safe operation current branch being disabled or the presence detection current branch detecting that the temperature sensor is absent.

10. The water heating system of claim 9, wherein the temperature sensor is located remotely from the safety cutoff circuit and the presence detection circuit.

11. The water heating system of claim 10, wherein the temperature sensor is located in a thermal well of the water storage tank of the water heating system, and wherein the safety cutoff circuit and the presence detection circuit are external to the water heating system.

12. The water heating system of claim 9, wherein the plurality of transistors are connected in series.

13. The water heating system of claim 12, wherein the plurality of further comprises a second transistor configured to receive input from one or more logic gates, and wherein at least one logic gate of the one or more logic gates is configured to receive the temperature signal as at least one input.

14. The water heating system of claim 9, further comprising a reset circuit in electrical communication with the safety cutoff circuit, the reset circuit being configured to provide, to the safety cutoff circuit, a reset signal responsive to a reset mechanism in communication with the reset circuit, wherein the safety cutoff circuit is configured to enable the safe operation current branch responsive to:

the water temperature in the water heating system returning to the permissible temperature range, and receiving the reset signal.

15. A method of energizing heating elements in a water heating system, the method comprising:

determining, by a presence detection circuit, a whether a temperature sensor is present or absent;

enabling a presence detection current branch responsive to determining the temperature sensor is present;

disabling the presence detection current branch responsive to determining the temperature sensor is absent;

determining, by a safety cutoff circuit, whether a water temperature sensed by the temperature sensor is within a permissible temperature range, wherein the water temperature is detected by the temperature sensor and output by the temperature sensor as a temperature signal, wherein the safety cutoff circuit comprises a plurality of transistors comprising a first transistor configured to receive the temperature signal from the temperature sensor as input; and enabling a safe operation current branch responsive to the water temperature being within the permissible temperature range; and disabling the safe operation current branch responsive to the water temperature being outside of the permissible temperature range, wherein enablement of the presence detection current branch and the safe operation current branch energizes one or more switches that power the heating elements of the water heating system, wherein disablement of the presence detection current branch or the safe operation current branch causes the one or more switches to disable the heating elements of the water heating system.

16. The method of claim 15, wherein the temperature sensor is located remotely from the safety cutoff circuit and the presence detection circuit.

17. The method of claim 15, wherein disabling the safe operation current branch comprises deactivating one or more transistors from among the plurality of transistors arranged in series.

18. The method of claim 17, wherein deactivating the one or more transistors from among the plurality of transistors comprises:

deactivating the first transistor responsive to receiving the temperature signal indicating the water temperature is outside the permissible temperature range as input; and deactivating a second transistor responsive to receiving input from one or more logic gates, the input indicating that the water temperature is outside the permissible temperature range.

19. The method of claim 18, wherein deactivating the second transistor further comprises at least one logic gate of the one or more logic gates receiving the temperature signal as at least one input.

20. The method of claim 15 further comprising:

generating, by a reset circuit, a reset signal responsive to a reset operation being performed; and enabling the safe operation current branch responsive to:
the water temperature returning to the permissible temperature range, and
receiving, at the safety cutoff circuit, the reset signal.

* * * * *